United States Patent
Satkunarajah et al.

(10) Patent No.: US 10,455,002 B2
(45) Date of Patent: Oct. 22, 2019

(54) APPARATUS AND METHOD FOR GENERATING CUSTOMIZABLE SOFTWARE BASED NETWORKING PLATFORMS

(71) Applicants: Tharmalingam Satkunarajah, Garden City, NY (US); Kalayini Sathasivam, Garden City, NY (US)

(72) Inventors: Tharmalingam Satkunarajah, Garden City, NY (US); Kalayini Sathasivam, Garden City, NY (US)

( * ) Notice: Subject to any disclaimer, the term of this patent is extended or adjusted under 35 U.S.C. 154(b) by 605 days.

(21) Appl. No.: 15/001,812

(22) Filed: Jan. 20, 2016

(65) Prior Publication Data
US 2017/0126786 A1     May 4, 2017

Related U.S. Application Data

(60) Provisional application No. 62/248,038, filed on Oct. 29, 2015.

(51) Int. Cl.
| | | |
|---|---|---|
| *G06F 15/16* | (2006.01) | |
| *H04L 29/08* | (2006.01) | |
| *G06F 3/0481* | (2013.01) | |
| *G06F 3/0482* | (2013.01) | |
| *G06F 3/0484* | (2013.01) | |
| *G06F 17/28* | (2006.01) | |
| *H04L 12/26* | (2006.01) | |
| *G06Q 50/00* | (2012.01) | |
| *G06F 9/44* | (2018.01) | |
| *G06F 8/34* | (2018.01) | |
| *G06F 8/36* | (2018.01) | |
| *G06F 8/60* | (2018.01) | |

(52) U.S. Cl.
CPC ............ *H04L 67/10* (2013.01); *G06F 3/0482* (2013.01); *G06F 3/04817* (2013.01); *G06F 3/04842* (2013.01); *G06F 3/04845* (2013.01); *G06F 8/34* (2013.01); *G06F 8/36* (2013.01); *G06F 8/60* (2013.01); *G06F 9/44* (2013.01); *G06F 17/28* (2013.01); *G06Q 50/01* (2013.01); *H04L 43/08* (2013.01); *H04L 67/02* (2013.01)

(58) Field of Classification Search
CPC ...................................................... H04L 67/10
USPC ........................................................ 709/217
See application file for complete search history.

(56) References Cited

U.S. PATENT DOCUMENTS

| | | | | |
|---|---|---|---|---|
| 8,311,041 | B1 * | 11/2012 | Nerieri | H04L 51/12 370/328 |
| 8,677,234 | B2 * | 3/2014 | Underwood | G06Q 10/10 715/250 |
| 9,286,273 | B1 * | 3/2016 | Bobykin | G06F 17/2247 |
| 2006/0020908 | A1 * | 1/2006 | Jain | G06F 8/60 717/101 |

(Continued)

*Primary Examiner* — Atta Khan
(74) *Attorney, Agent, or Firm* — Pasadena Legal Group; Norman R. Van Treeck

(57) ABSTRACT

The present invention is directed to a system and apparatus for generating a computer network for accessing and transmitting data of and between multiple users. In a particular implementation, the system comprises a computer network generator having at least one processor and configured by code executing therein to generate an updatable core network package and select from an array of network feature modules, a plurality of ancillary features and customizations for incorporation into the computer network.

10 Claims, 3 Drawing Sheets

(56) References Cited

U.S. PATENT DOCUMENTS

| | | | |
|---|---|---|---|
| 2009/0276206 A1* | 11/2009 | Fitzpatrick | G06F 9/454 704/2 |
| 2013/0159984 A1* | 6/2013 | Misovski | G06F 8/60 717/168 |
| 2014/0323817 A1* | 10/2014 | el Kaliouby | A61B 5/165 600/300 |
| 2015/0019722 A1* | 1/2015 | Narayanan | H04L 43/0876 709/224 |
| 2015/0169293 A1* | 6/2015 | Bozek | H04L 67/10 717/106 |
| 2016/0322028 A1* | 11/2016 | Windridge | A61B 5/4833 |

* cited by examiner

APPARATUS AND METHOD FOR GENERATING CUSTOMIZABLE SOFTWARE BASED NETWORKING PLATFORMS

CROSS REFERENCE TO RELATED APPLICATION

This application claims the benefit of U.S. provisional application Ser. No. 62/248,038, filed Oct. 29, 2015, which is hereby incorporated by reference in its entirety.

1. INTRODUCTION

The present invention describes systems and methods for generating native language or symbols based network infrastructure using a core application and integratable components.

2. BACKGROUND

Just a few years ago, the idea of an online social network was revolutionary. While the Internet has always provided a way for people to make connections with each other, social-networking sites made it easier than ever before to find old friends and make new ones. Today, it's rare to find someone who hasn't heard of names of various popular social networks.

A major challenge exists in that although many use these social networks and applications, the majority users are young (e.g. under 60 years old). Technology has built a generation gap between younger, intuitive users of social networks and older users that find access complex and non-intuitive. One reason for the apparent non-intuitive nature of technology in general and social network platforms in specific is that older users (e.g. above 60) find the syntax, workflow and language used to convey functionality complex and hard to understand. The second major reason is that most of the social networking sites are created in English. While there are many examples of language localization in software platforms, very few are designed with non-native English speakers in mind.

What the present art lacks is a mechanism for generating and deploying a social network that has native language functionality or symbols incorporated within the fundamental architecture of the system so as to not suffer from errors in conversion from one language to other like (e.g. improper idioms and phrases). Often when existing social network interfaces are localized to a different language, the process often uses idioms or language that, while grammatically correct, lacks the subtitle distinctions inherent in local, regional or ethnic dialects and patois. As a result, even when a user interface is localized to a "native" language, many potential users, such as older users, will still have trouble appreciating the functions and actions accessible to them. Moreover, what is needed is a system and apparatus for controlling the social network using speech, symbols and iconography based user interface elements such that a reliance on pure text input is minimized.

Therefore, what is needed in the art is a system and apparatus that allows users with little technical skill to create and deploy native language and icongraphically based social networks. Furthermore, what is needed in the art is a system and method of allowing users to control and utilize the functionality of the native language social network using native and instinctive language and communication strategies.

3. SUMMARY

Provided herein is a network package that is specifically tailored for a group of users with particular requirements. The network package is deployed to the specific group of users. In accordance with one aspect that can be implemented in one or more embodiments, the present invention is directed to a system and apparatus for generating a computer network for accessing and transmitting data of and between multiple users. In particular, the system comprises a computer network generator having at least one processor and configured by code executing therein to generate an updatable core network package and first module array of network feature modules from a module repository wherein each element of the first array is a reference to one or more modules. The processor is further configured for receiving an initiating request to generate a new social network application sent by a remote user computer device, wherein the request includes initialization data relating to the estimated size of the user base of the computer network and the estimate technical ability of the estimated user base; and transmitting, in response to an initiating user request, at least one visual indication referencing each element in the first array to the remote user computing device; selecting, using the remote user computing device, at least one of the visual indications corresponding to a unique element in the first array modules. The configured processor also transmits to the computer network generator at least a reference to each selected module and associates a core network application with each selected module. A finalized network application is generated by the processor that includes reference to each of the selected modules and a user interface application customized to the technical ability of the estimated user base. The generated application is deployed to a remote hosting computer; and a link is provided that allows users to access the user interface application.

Another feature of the present invention is directed to an apparatus and system for creating and utilizing an adaptive user interface. The system comprises a user interface generator having at least one processor and configured by code executing therein to generate a plurality of adaptable user interface elements; the adaptable user interface elements each having a plurality of access levels. Each access level is configured to give a user an increasing level of control over the functionality controlled by the user interface. The access level of the adaptable user interface is set to an initial level by the user interface generator. A usage monitor monitors the use of the user interface components by a specific user and implements a change in the access level of the user interface element in response to user feedback.

These and other aspects, features and advantages of the present invention can be further appreciated from the following discussion of particular embodiments thereof.

4. BRIEF DESCRIPTION OF THE DRAWINGS

The foregoing and other features of the present invention will be more readily apparent from the following detailed description and drawings of one or more exemplary embodiments of the invention in which.

5. DETAILED DESCRIPTION

By way of overview and introduction, the present invention concerns an apparatus, system and method for creating, customizing and developing a language-specific, feature-selected social network software application and/or website and ancillary client device access applications.

Specifically, the present apparatus, system and method are directed to generating and deploying an online networking service, platform, or website which is focused on allowing user-to-user connectivity, community interaction and general informational submission. The present invention provides a system that allows users to easily generate software based networking services (e.g. a social network) for use by Internet accessible client devices in a specified language and having features that are relevant and useful for the community that is deploying the network. For example, the present invention allows for the generation of a customized social network in a users native language or symbols, and provides features that allow for voice control services, native language user interface elements, telephone and location based services through a modular architecture.

5.1 System Overview

Figure 1:
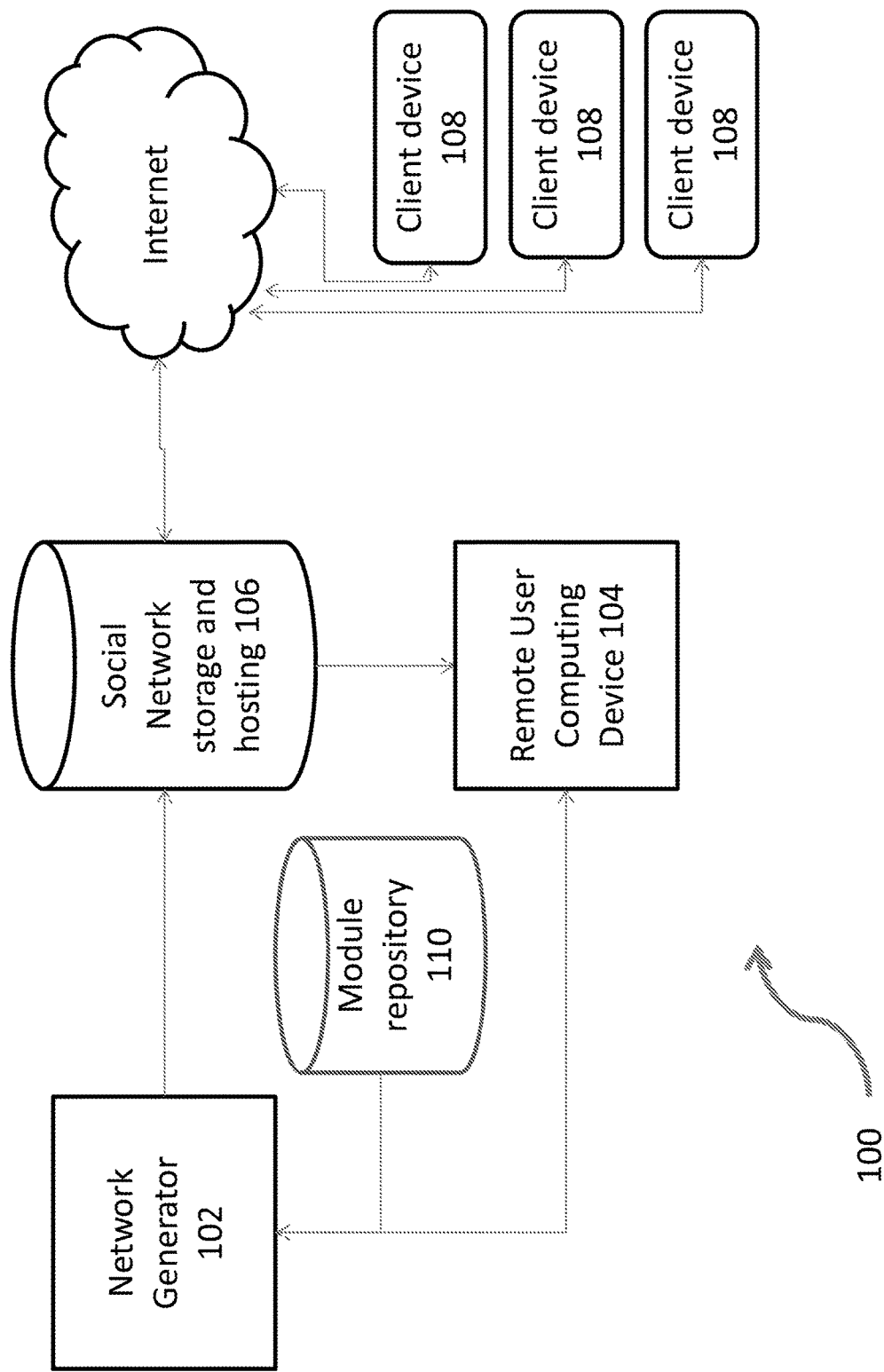
FIG. 1 is an overview block diagram detailing the arrangement of elements of the system described herein in accordance with one embodiment of the invention.

Turning to FIG. 1, a block diagram of the overall system 100 is provided. As shown, a network generator 102 has connections to a module repository 110, a remote computing device 104 and a social network storage and hosting apparatus 106. In one embodiment, the connections between the different devices are wired or wireless connections implemented as a local area network (LAN). In an alternative embodiment, the connections between the various apparatus shown include Internet network connections and can include various routing and other network hardware, including but not limited to exchanges, servers, routers, hubs and other network infrastructure necessary or useful for allowing various devices to connect to the one another remotely.

For example, the remote user computing device 104, in one embodiment is connected to the network generator 102 via the Internet or another network that allows for remote access to the computing resources of the network generator 102. Likewise, in this configuration, the module repository 110 and the social network storage and hosting apparatus 106 are remotely accessible to the network generator 102 and remote computing device 104.

In a particular arrangement of elements provided, the network generator 102 is a computer equipped with a one or more processors, RAM and ROM memory, network interface adaptors and one or more input or output devices. In a further embodiment, the network generator 104 is a computer server or collection of computer servers, each server configured to store, access, process, distribute or transmit data between one another and other computers or devices accessible or connectable therewith. In still a further embodiment, the network generator 102 is a hosted server, virtual machine, or other collection of software modules or programs that are interrelated and hosted in a remote accessible storage device (e.g. cloud storage and hosting implementation) that allows for dynamically allocated additional processors, hardware or other resources on an "as-need" or elastic need basis. In a further embodiment, elastic load balancing algorithms are utilized to ensure that sufficient back-end capacity is present to enable the system to handle multiple concurrent connections and requests.

In one embodiment, the network generator 102 is configured to generate, using code executing in the processor(s) a core social network application that can be deployed alone or in conjunction with additional features or modules that enhance its functionality.

In order to obtain a list of available additional feature modules, the network generator 102 establishes a connection with a module repository 110. The module repository 110 is configured to store a plurality of components that can be added to the core social network application. As described in more detail below, the components stored in the module repository provide additional features and functionality to the core social network application generated by the network generator 102. By way of non-limiting examples, the components stored by the module repository include instant text messages, voice calling facilities, recorded voice delivery functions, call recording features, conference calling features, presentation features, voice modulated self-portrait, symbols and cartoon character sending features, sticker attachment features, regional based multilingual text generation features, multilingual voice to text conversion features, map and location finder features including regional language recorded speech guidelines and instructions, known online and last seen summary data features, recorded remainder alert system features, home safety encrypted alert system functionality, mobile security platform features, photo/status display timeline features, GIF based photos for profile and wall, like, comment, sharing with self-animated character features, voice commenting feature on status or photos features, and official pages features.

Those possessing an ordinary level of skill in the art will appreciate that in one embodiment the module repository 110 is a database, such as a NoSQL, SQL, or other flat, relational, object, or index type of database configured to store and provide access to data. Alternatively, the module repository 110 is a file or data storage device, such as a remote hard drive, or storage apparatus. Regardless of the storage or database type, the module repository 110 also includes any necessary processors, components, control systems, network interfaces or other ancillary software or hardware necessary to transmit data between the module repository 110 and the network generator 102

The particular modules that are accessed and incorporated into the core social network application are selected by a user using a remote user computing device 104. In one embodiment, the remote user computing device is a stand-alone, or desktop, computer configured to directly, or via the Internet, access and communicate data with the network generator 102. In a particular embodiment, the remote user computing device 104 is a portable computing device such as an Apple Ipad/Iphone® or Android® device or other commercially available mobile electronic device. In other embodiments, the remote user computer device 104 includes custom or non-standard hardware configurations. For instance, the remote user computer device 104 is a micro-computer or collection of micro-computing elements, computer-on-chip, prototyping devices or "hobby" computing elements.

The remote user computing device 104 is configured, through software executing in one or more processors, to enable the user to initiate a new network generation request. In one arrangement this network generation request includes information about the size, language, technical sophistication, and preferred access devices of the intended user base. The remote user computing device is further configured to permit the user to select modules for incorporation into the social network generated by the network generator 102 and control the installation and deployment of the social network once the relevant features have been incorporated.

The social network storage and hosting device 106 is configured to permit public or restricted access to the generated social network. The social network storage and hosting apparatus 106, in one embodiment, is a database and web hosting server configured to accept connections from client devices 108 and transmit data relating to the computer network, such as text data and images. In an alternative arrangement the computer network storage and hosting apparatus is a virtual machine, a collection of virtual machines, or other hosting solutions configurable to allow client devices 108 to communicate with one another and access data stored by the computer network regarding user profiles and other information.

5.2 Generating a Customized Social Network

Figure 2:
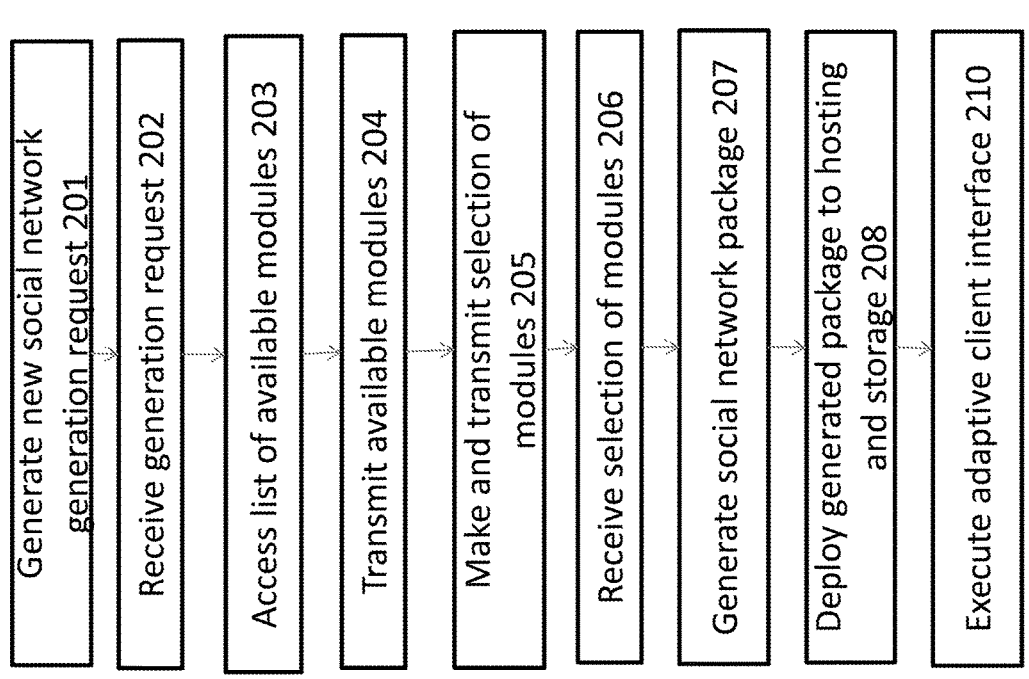
FIG. 2 is a flow diagram detailing the steps of an embodiment of the method as described herein.
Figure 3:
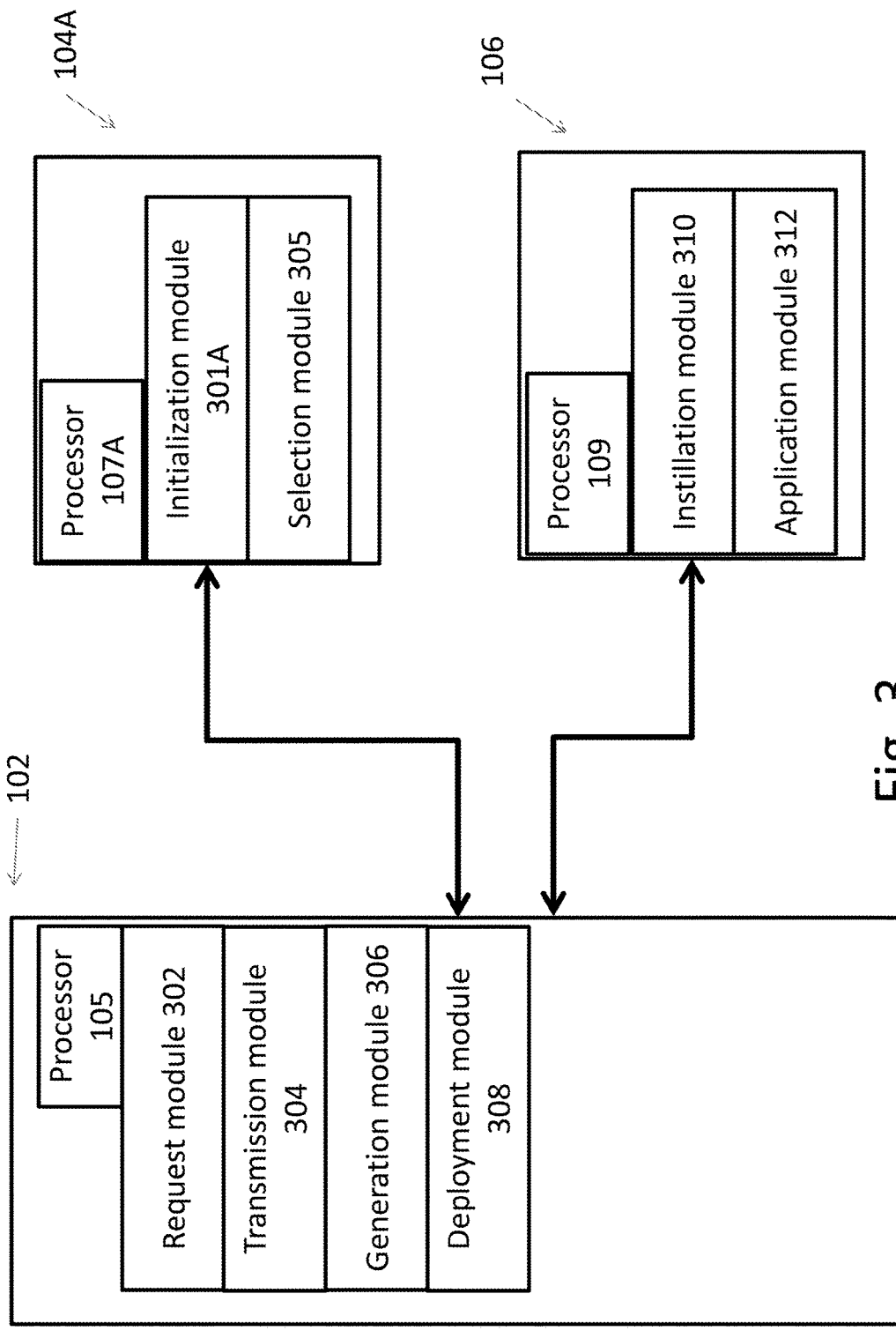
FIG. 3 is a block diagram of an example system in accordance with an embodiment of the present invention.

FIG. 2 details particular work-flows in accordance with certain aspects of the invention. The steps shown in FIG. 2 can be carried out by code executing within the memory of one or more processors 102 found within the various hardware devices communicating with one another. The code may be organized into one or more modules, or can comprise firmware or hard-wired circuitry as shown in FIG. 3. For simplicity of discussion, the code referenced in FIG. 3 is described in the form of modules that are executed within a processor 105 of the network generation system 102 and which are each organized to configure the processor 105 to perform specific functions. The block diagram of FIG. 3 provides exemplary descriptions of the modules that cooperate with a memory and processor 105 of the network generator 102 and cooperate to carry out the steps outlined in FIG. 2. Those possessing an ordinary level of skill in the art will appreciate that any processor of the network generator, remote user computing device, module repository, and social network storage and hosting devices can comprise a plurality of cores or discrete processors, each with a respective memory, which collectively implement the functionality described below, together with associated communication of data there between.

With reference now to FIGS. 2 and 3, the customized network (such as a social network) is generated by initiating a request to generate a new social network using the initialization module 301 which comprises code executing in the processor 107 of the remote user computing device.

The initialization module configures the processor 107 to send a request to the social network generator according to step 201. In one particular embodiment, the initialization module 301 configures the processor 107 to create a data object that includes basic or standard information regarding the network to be generated. For example, a user selects an anticipated size of the user base of the intended network, the primary access and connectivity details (e.g. mobile device, desktop, dial-up, broadband etc.) as well as the skill and educational level of the anticipated user base (novice computer users, literacy level). The initialization module 301 packages this data into a data object, such as a JSON file, and transmits the data object to the network generator 102.

Upon receipt of the data object containing the basic features of the network as shown in step 202, the processor 105 is configured by the request module 302 executing therein, to extract the information from the data object and build a profile of the network to be generated.

The processor 105 of the network generator is configured, through the transmission module 304 to access the module repository and obtain a list of modules for potential inclusion into the social network, as in step 203. As will be discussed below, each of the modules in the module repository are configured to augment or enhance the features of the network.

The list of modules obtained in step 203, are transmitted to the remote user computing device, such as by a processor configured by the transmission module 304. The user selects from the list of modules, optionally presented as a collection of icons or other symbolic or pictographic depictions, the desired modules to incorporate into the social network as in step 205 and implemented by selection module 305.

Upon receiving the selection of modules for inclusion into the social network, as in step 206, the processor of the network generator 102 is configured by the generation module 306 to generate the network based on the profile and the selected modules, as in step 207.

Those skilled in the art will appreciate that the code automatically generated by the generation module can be in object, source or machine code. For example, the generated social network can be written or coded in any available or suitable programming language or environments, such as but not limited to, Java, Javascript, Node.js, C, C#, C++, Objective-C, Swift, Clojure, Swift, Docker, Python, PHP, Lua, R, F#, Ruby, Perl, Lisp, Erlang or any dialects etc. As one example, a social network application generated by the network generator 102 and the modules stored in the module repository 110 are written in Erlang, which is a language built for writing scalable applications that are designed to withstand errors. It will be appreciated that Erlang uses abstraction conventions called the Actor model to implement concurrency principles. Instead of the more traditional shared memory approach, actors communicate by sending each other message. Actors unlike processing or communication threads are designed to be lightweight. Actors could be on the same machine or on different machines and the message passing abstractions works for both. Thus, the generated social network can be deployed to highly parallel computing machines consisting of hundreds or thousands of independent microprocessors, each with its own local memory and communications processor, communicating via a high-performance communications network. In a further embodiment, the social network is created using Erlang with OTP.A to improve horizontal scalability.

In one embodiment of the generation module 306, a properly configured processor implements a collection of code libraries representing the different modules listed in the module repository. The collected code libraries are referenced by the core social network application and the entire code base is packaged for installation or deployment as an application according to the deployment step 208.

Alternatively, the generation step 207 is implemented as providing the core social network application with API access (application programming interfaces) to each of the modules. In this arrangement, each of the modules operates as a separate and independently accessible code repository that is accessible by users of the social network, but with functionality provided by the modules not directly incorporated into the core application that is deployed.

In one embodiment, the core social network application includes a configured server with a accessible API, a database, file storage and a user client application. The file storage is configured to store files such as images, videos and documents and The client application can be either a mobile or desktop web application or a native app that is built using the requisite code and libraries necessary to have the client be implemented on a particular hardware platform. The API allows access to the server (and each of the selected program features), database and file storage directly from a customized client developed by third parties. The API further includes connections to a secondary server not accessible to the client but which handles encryption of financial transactions and communications.

Upon generation of the custom network application, the application is installed in a suitable hosting or server, such as Amazon EC3 or other cloud storage and hosting configuration as in step 208. In one embodiment, the deployment module 308 automatically selects a preferred hosting environment based on the profile data provided during the initialization step 201. For example, the deployment module 308 selects a particular hosting configuration based on the anticipated number of users, a budget for the hosting the network and other considerations. Once the application (such as application module 312) is deployed at the hosting location, a domain or url is generated or associated with it and permits client devices 108 to access the network via a communications network.

In a further embodiment, the generation module 108 also generates a client device application using a client user interface sub-module that configures code executing in the processor of the network generator to generate a client device application. The generated client device application allows a client device to connect to the social network without using a browser or other generic software platforms. In a particular embodiment, the client device application is a HTML5 application that replicates or provides access to all the features a user of the generated network would have access to using a browser. In another embodiment, the client device application is generated in a compatible format for native execution on an IOS, Android, Amazon, Windows, OSX, Linux or other devices.

The user interface of the social network, either accessed through a URL or directly through a native client device application is customized to both the language and the anticipated user knowledge level provided in the initial request to generate the social network (as in step 201). The user interface is thus configured to provide a social network that is customized to a specific population and allows for greater social interaction among the users.

5.3 Adaptive Interface

Based on the size, language, technical sophistication, and preferred access devices of the intended user base provided in the initialization process, the user interface module implements an adaptive user interface as in step 210. As a non-limiting embodiment, where the initial request indicates that the anticipated users of the social network will have low technical experience, the user interface implements an adaptive user interface to customize the provided access to a given proficiency level. Here, the user interface disables options or other features of the social network that more experienced users might find useful. For example, settings such as conversion protocols and file formats are masked or removed and default or common settings are used without asking for user input. Likewise, text or commonly used icons are replaced with pictograms or other information identifiers that provide context for the function of the various features. For instance, icons are replaced with the text equivalent and vice versa. In these configurations, the user interface or layout is expanded or modified to incorporate text instead of icons. The social network is equipped with machine learning algorithms that review user actions and determine when a user has sufficient comfort with the functionality of the social network to increase access to features, such as sub-menus and additional customizations.

In this way users with low technological literacy can be guided to more specialized functions without overwhelming the user at first use.

In a further embodiment the generated network application includes a customized, user interface and selected content layout. For example, when a user accesses the social network using a client device, a particular content layout is provided. However, upon in the event that the adaptive interface changes text to icons, or adds additional features or functionality, the content layout of the network interface for that user is altered. Thus, the system provides allows for a regeneration or rearrangement of a particular user's user interface to incorporate the changes resulting the adaptive interface. For instance, the user interface presented to the user could be a simple collection of large text links indicating basic functionality. However, upon adaptation, the text is replaced with icons and additional, higher order functionality. Thus, the content found in the user's user interface can change depending on their technical proficiency level.

In a further embodiment, the customized layout generated by the user interface module includes specific idiomatic phrases or symbols that are relevant to the user base. For example, where general localization schemes would replace an English word with a rough approximation of the same word in a target language, here the user interface module looks up (in a database or look-up table) a user supplied table that maps specific English (or another source development language) to a specific word, phrase, symbol, icon or other contextual identifier that has an appropriate meaning in the target language. In this way, functionality is presented using idiomatic phrases or language having closest or clearest intended meaning. In a further embodiment the look up table is updatable by the user community to as to provide constant refinement of the replacement text, symbols or icons used with the network.

5.4 Modules for Inclusion into the Generated Network

As provided, the social network is customizable to incorporate a plurality of additional features and functions beyond the core social networking functions of posting, sharing and commenting on user content. In one particular embodiment, one or more of the following features are implemented by accessible code modules or APIs defined in the module repository 110 and accessible to the network generator for inclusion in the core social network package.

5.4.1 Instant Text Messages

The system so described is configured to integrate instant text messaging functionality into the social network package. Text message functionality allows the user to send instant messages with unlimited character, text, numbers, special characters, clipart and various iconographic symbols given specific libraries accessible by the user. The text message functionality can also include encryption support to protect messages from external hacking or access. In a non-limiting example of such message protection, when a text message is sent from one user to another user, the message is stored in a message database (such as one generated by the social network storage and hosting device) until the other user receives it. The stored text messages are then automatically deleted from the database. In a further embodiment, user message data is stored in the database for a set time period, such that after a maximum number of days the message is deleted.

Those possessing an ordinary level of skill in the art will appreciate other messaging applications rarely work on a peer to peer basis. In contrast, the text message module incorporated into the text module does not cause a processor to open a connection (from a user device) to recipient's device. Instead the user's device connects to the social network storage and hosting device 106. The text messaging application includes sub-modules that configure the processor to use TCP protocol or HTTP or XMPP protocols to communicate users' messages to the social network storage and hosting device (herein the SNSH 106) 106. The SNSH 106 is configured to work in concert with the text messaging module to dispatch messages stored in the SNSH 106 to another user.

In the event that there is an active connection between the recipient and the SNSH 106 at the time a message is sent, then the active connection will enable real or near real time communication. However, in the event that the recipient is not actively connected to the SNSH 106 ("offline"), then the text message module configures the SNSH 106 to generate a push notification via an alternative communication channel. Each user/device is represented as an actor. This actor is responsible for handling the inbox of the user, how it gets serialized to storage, the messages that the user sends and the messages that the user receives one after another.

By way of non-limiting example, the text messaging module confers on the users of the generated social network the ability for User "A" to message User "B". User "A"'s computing device establishes a connection to the SNSH 106 and it is established that this connection is definitely from User "A"'s mobile computing device, such as though the use of a plurality of submodules configured to establish connections and authenticate users. User "A" sends via TCP protocol the following message: "For User B Can you come home this evening?" The SNSH 106 deserializes this message and delivers this message to the actor called User "A".

User "A" has the option of serializing this message and storing it in a storage location accessible by the SNSH 106. Such as in a "User "A"'s Sent Messages", storage location. It should be appreciated that such storage is stored on a replicated file system to prevent data loss due to unpredictable events. User "A" the actor then decides to forward this message to User "B" the actor by passing it a message "Msg1 from User" A":"Can you come home this evening?".

User "A" can retry with exponential back-off till User "B" the actor acknowledges receiving the message. User "B" the actor eventually receives the message and decides to store this message in a file called "User "B"'s Inbox". Once it has stored this message, User "B" actor will acknowledge receiving the message by sending User "A" actor a message of its own saying "I received Message 1". User "A" actor can now stop it's retry efforts. User "B" actor then checks to see if User "B"'s phone has an active connection to the server. Afterwards, User "B" is configured to stream this message to the device via TCP.

User "B" sees this message and replies with "For User "A": "Sure I will come this evening." This message is now received by User "B" actor as and then the same procedures follow back and forth.

5.4.2 Voice Calling Functionality.

The system so described is additionally configured through the use of optional modules to integrate voice calling functionality into the network. In one embodiment, the voice calling functionality is implemented as one or more modules that configure the processor of the SNSH 106 and/or client device 108 to implement voice calling functionality using a XMPP (Extensible Messaging and Presence Protocol) protocol. Using such protocol VOIP (Voice over Internet Protocol) functionality converts analog voice recorded by a microphone to digital signals (bits). The bits are compressed in specific format for transmission. The voice packets are inserted as data packets using real-time protocols like RTP over UDP over IP. Furthermore, the voice module is configured to implement a signaling protocol to call users using a protocol like ITU-T H323. At the receiver end of the voice communication, the module is configured to disassemble the encoded packets, extract data in digital format, then convert the digital signal to analog voice signals and send them to an audio output device used by the recipient. In a further embodiment, the device is a mobile telephone. In yet a further embodiment, the transfer of voice data from a caller to a receiver is implemented in real or near-real time to avoid delays.

It should be understood that current technology allows for the conversion of audio into digital with a 16 bit band of 22050 Hz (for sampling it you need a frequency of 44100 Hz according to the Nyquist Principle) obtaining a throughput of 2 bytes*44100 (samples per second) or 88200 Bytes/s, 176.4 Kbytes/s for stereo stream. However, the VoIP implemented by the voice calling modules does not require such throughput. The current implementation only requires 176 kBytes/s to send voice packet. Furthermore, using pulse code modulation (PCM), Standard ITU-T G.711 with a Voice bandwidth of 4 kHz, the module of the present invention is configured with a sampling bandwidth of 8 kHz (for Nyquist). The voice calling module represents each sample with 8 bit (having like 256 possible values). Thus, the throughput is 8000 Hz*8 bit or 64 kbit/s, is typical for a digital phone line.

Additionally, in real time applications, ADPCM, Adaptive differential PCM, Standard ITU-T G.726 are used. Thus, the voice calling module allows for the conversion of only the difference between the actual and the previous voice packet requiring 32 kbps. LD-CELP, Standard ITU-T G.728, CS-ACELP, Standard ITU-T G.729 and G.729a, MP-MLQ, Standard ITU-T G.723.1, 6.3 kbps, Truespeech, ACELP, Standard ITU-T G.723.1, 5.3 kbps, Truespeech and LPC-10, able to reach 2.5 kbps. These protocols are, in one embodiment, incorporated and used by the voice module because they can guarantee a very low minimal band using source coding; also G.723.1 codecs have a very high MOS (Mean Opinion Score, used to measure voice fidelity) but performance required by them is roughly up to 26 MIPS.

In a further embodiment, RTP Real Time Transport Protocol is used to encapsulate the voice data into TCP/IP stack such that VoIP data packets are encapsulated into RTP which inturn is encapsulated in UDP, IP packets and then I, II layers Alternatively, the voice calling module uses RSVP, which manages Quality of Service (QoS). RSVP is a signaling protocol that requests a certain amount of bandwidth and latency in every network hop that supports it. Quality of Service (QoS) as VoIP applications require a real-time data streaming because it allows for a highly interactive data voice exchange.

The voice module can further incorporate TOS fields in IP protocol (IP header) to describe type of service, such that high values indicate low urgency while lower values indicate increased urgency. Congestion Avoidance, like RED (Random Early Detection) is also implemented by one or more sub-modules of the voice calling module.

The voice module utilizes, in one embodiment, h323 as a signaling protocol that allows a variety of elements talking one another including but not limited to Terminals, Gatekeepers, Address translation service, Admission control. h323 not only allows VoIP but also allows video and data communications. h323 can carry audio codecs G.711, G.722, G.723, G.728 and G.729 while for video it supports h261 and h263.

Thus, though the protocols and implementations described, the voice calling module provides the social network with enhanced communication functionality.

5.4.3 Recorded Voice and Video Functionality:

The system so described includes a library for integrating data recording functionality into the social network. In one embodiment, the data recording functionality is implemented as one or more modules that configure one or more processor of the SNSH 106 or client device 108 to receive streaming voice data or a recorded audio file from a client device. In one embodiment, the voice recording is provided in .wav/mp3/mp4 formats with a maximum recording time of 15 minutes.

In a further arrangement, the voice recording module includes a sub-module for providing auto clean up functionality in which messages or audio recordings are deleted automatically from a user's profile accounts stored on the SNSH 106 or client device in the event of a triggering event.

In a further embodiment, the data recording module is configured to provide the deployed application or the client device with a video recording. In a particular embodiment, the video is recorded in MP4 format and is changed to 3GP format in order to allow for more efficient transmission of the video data. In further embodiments, the duration or quality of the video is determined by the user, or by the capabilities and hardware limitations of the client device or the deployed social network application.

5.4.4 Call Recording Feature:

The system so described is additionally configured to integrate call recording and conference call functionality into the social network. In one embodiment, the call recording and conference call functionality is implemented as one or more modules that configure one or more processor of the SNSH 106 or client device to enable users to record all incoming and outgoing calls, and make copies thereof. In a particular embodiment, the call recording and conference call module records all of the voice calls which are made from a specific client device (i.e, a Smartphone). The collection of call data is then organized in a time based order and is associated with call metadata (e.g. time of call, duration of call, even other person's location in latitude, longitude and altitude (X,Y,Z) if the other user allows the access to this feature on the other user's phone through the application) and provided to the user for searching and review.

5.4.5 Video and Audio Conference Call and Recording Functionality

Additionally, the generated network is extendable to integrate call recording and conference call functionality. In one embodiment, the call recording and conference call functionality is implemented as one or more modules that configure one or more processor of the SNSH 106 or client device 108 to enable users to set-up, maintain and record the communications exchanged during a conference call or a teleconference. By recording these calls, a teleconference can serve two purposes, both as a real-time communication tool as well as an archival record of such events as press conferences, corporate earnings reports, stockholder meetings, legal depositions, journalist interviews, podcast interviews for broadcast online, client meetings, teaching group discussions, scientific research discussions, company meeting from different branches around the world. In one embodiment, the recorded conference calls is converted to .mp3 or .wav or .mp4 format and stored on to the client device or user's storage location accessible by the SNSH 106.

In one embodiment, the conference call modules configure the processor or the SNSH 106 to implement a conference call with a maximum number of people in a audio only mode and a maximum of people in a video call mode. Those possessing the requisite level of skill in the art will appreciate that the maximum number of concurrent users of a conference or video call is dependent on the hardware and software capabilities of the client devices and the social network.

5.4.6 Image and Multimedia Exchange:

The system so described is configured to integrate multimedia creation and exchange functionality into the social network. In one embodiment, the multimedia creation and exchange functionality is implemented as one or more modules that configure one or more processor of the SNSH 106 or the client device connected thereto, to access a library of illustrated characters, greeting card templates, party invitations, wedding invitations, marriage proposal templates, collage templates, video presentations and illustrations and select one or more for transmission to other users. Furthermore, such media presentations can be customized by recording an audio note and attaching it to form a multimedia presentation.

In a particular arrangement, through the operation of one or more sub-modules, the facial (or other anatomical features) expressions, movement, actions of illustrations or art assets are animated in response to the tone, pitch and inclination of the recorded message. As an additional feature, implemented by one or more modules that configure the processor of the SNSH 106 or client device, an image of the user is acquired and modified and juxtaposed with an illustrated character. For example, an image of the user's head is modified such that the image is placed upon the body of the illustrated character.

5.4.7 Profile and Landing Page Customizations

The social network generated according to the foregoing is in one or more embodiments, configured to incorporate customizable profile generation functionality. In one embodiment, the generated social network application incorporates a module that configures one or more processors to enable a user to make one or more public or private profiles and to join one or more public or private groups or associations. As an example, groups can be created by sending a text or multimedia message to a plurality of recipients. Each of those recipients is now in a group messaging environment where all messages exchanged in response to the original message are shared to each member of the group.

5.4.8 Localized Language Sticker Generation—:

The system so described is configured to integrate localized language sticker generation functionality into the social network. In one embodiment, the localized language sticker generation functionality is implemented as one or more modules that configure one or more processor of the SNSH 106 or the client device to provide to the user a plurality of native based stickers generated from images or text typed. For example, a user in France types 'Good Morning' or 'Bonjour' into a text box or field. This data is sent to the SNSH 106 and a related sticker library is search or a new sticker is generated that can be sent as an image.

5.4.9 Multilingual Voice to Text Converter Feature:

The system so described is configured to integrate voice to text translation functionality into the social network. In one embodiment, the localized text generation functionality is implemented as one or more modules that configure one or more processor of the SNSH 106 or the client device 108 to provide a conversion of the recorded voice or text input into a destination language. As a non-limited example, a user speaks in Hindi and the user's voice is recorded. This voice is transcribed into a text transcript and converted into English for transmission to an English language speaker. Upon receiving the transcript, a text-to-speech sub-module converts the transcript back to spoken language in the language of the user's choice. In one embodiment, both the voice and text processing utilize digital signal processing techniques coupled to grammatical libraries in order to provide grammatically correct translations.

In another embodiment using the multilingual voice to text conversion modules, a user of the generated network is enabled to execute a search of the social network or $3^{rd}$ party Internet search engines using their respective native language. In this implementation, a user initiates a search in their native language; the native speech is converted to native text format, translated to English, and searched using a search engine. The results are again translated to native text and speech and provided back to the user.

5.4.10 Map Finder Feature with Regional Language Recorded Speech Guideline/Instruction:

The system so described is configured to integrate mapping and location based functionality into the social network. In one embodiment, the mapping and location based functionality is implemented as one or more modules that configure one or more processor of the SNSH 106 or the client device 108 to provide to a user a voice based interface to access transit maps and other transportation data. In one embodiment, a user generated data, such as speech to text or directed text input, identifies a desired destination. The mapping and location module configures processor of the SNSH 106 or the client device to generate a route that makes use of preferred transportation modes and provides directional guidance in the user's native language.

5.4.11 Know Online Last Seen Summary:

The social network generated according to the foregoing is in one or more embodiments, configured to incorporate personal locator functionality. In a particular configuration, the personal locator function allows the user to view the last recorded location of contacts and to determine the last time such contacts established an active connection to the social network. In a particular configuration, the personal locator uses a connection to a GPS or other device that is accessible and authorized by each user's client device to provide coordinate locations. In a further embodiment, the personal locator module uses IP address data to determine the general proximity of the user the last time they established a connection with the social network.

5.4.12 Recorded Remainder Alert System:

The social network generated according to the foregoing is in one or more embodiments, configured to incorporate recorded reminder alerts. In one embodiment, recorded reminder alerts functionality provides a time-based reminder system that reminds the user of events like meetings, parties, and travel alerts. The system is further configured to upload schedules or other appointment data from $3^{rd}$ party scheduling providers so as to set remainders based on schedules and parameters in it.

5.4.13 Home Automation and Safety Encrypted Alert System:

The social network generated according to the foregoing is in one or more embodiments, configured to incorporate remote automation and security device interconnectivity functionality. In one embodiment the generated network application incorporates a module that configures one or more processors to enable a user to connect to Internet accessible devices connected to the generated network or Internet, such as home automation and security systems. In this arrangement, external sensor systems and other locker facility provided are integrated into the social network and can upload and exchange data with the social network such that security systems and connected locking devices are controllable or monitored via commands or posts made to the social media system.

In a further embodiment, the user has access to Internet connected appliances from anywhere in the world, such as monitoring HVAC equipment and other devices. In one embodiment, the appliances and security hardware connect to the Internet or through gateway routers via Bluetooth or Wi-Fi.

5.4.14 Mobile Security Platform Functionality:

The social network generated according to the foregoing is in one or more embodiments, configured to incorporate mobile device security functionality. In one embodiment the generated social network application incorporates a module that configures one or more processors to enable a mobile device recovery option through IMEI (International Mobile Station Equipment Identity) number and provides recovery options for a lost or stolen mobile device. In the event that a mobile device, such as a smartphone or tablet is lost or stolen, $3^{rd}$ parties might have access to sensitive photos, email, social network status, personal notes, contacts, text messages etc. Thus, the mobile security module configures one or more processors of the SNSH 106 or client device 108 to deny data requests from a client device 108 that has been reported lost or stolen. Likewise, the next time the misplaced client device 108 utilizes a network connection, an access denial module checks against a network status key provided by the generated network. In the event that the misplaced device is indicated on the generated network as missing, the access denial module locks access to the features of the device and generates a message for display on the device indicating that the device is lost and providing contact details. Additionally, through a submodule, the mobile device security module access location data and provides specific and general location data regarding the location of the lost or stolen device.

Additionally, the security module provides for the implementation of passkey login that enables a secure connection between the client device and any downloaded data. Thus, in the event of a lost or stolen client device, the data stored therein is protected.

5.4.15 Police and Emergency Services

The social network generated according to the foregoing is in one or more embodiments, configured to provide police and emergency services alerts, dispatching and communication functionality. In one or more embodiments of the generated social network, the client application provides an emergency messaging function that generates a message or alarm and transmits the message to local authorities. For example, the client device, based on user selection of an icon or text, generates a message that includes the coordinates of the user (as obtained from GPS, IP address information or other means) and some information as to the nature of the emergency (fire, medical attention, criminal activity) to the relevant authorities. In a further embodiment, the alert message generated and sent by the client application also calculates the shortest route to the user's location from the nearest police, fire or emergency facility.

In a further embodiment, the client application is configured to generate an emergency alert and send it to individuals pre-selected from the user's contact list. Alternatively, the client application is configured to apply context based rules to generate a preferred contact person given location, time of day and activity.

5.4.16 3$^{rd}$ Party Pages:

The social network generated according to the foregoing is in one or more embodiments, configured to incorporate 3$^{rd}$ party content integration functionality. In one embodiment the generated social network application incorporates a module that configures one or more processors to enable the social network to host and display official pages utilizing content and data not hosted in the SNSH 106. For example, pages can be made that highlight information regarding entrepreneurial businesses, place/tourism, company organizations, educational institutions, hospitals, research labs, brand or products, artists, band or public figures, entertainment venues, cause or community events, maintenance and service announcements and other content distributed by linking to those 3$^{rd}$ party content providers. Additionally, government announcements, police information and requests can be distributed or accessed using the 3$^{rd}$ party pages module.

5.4.17 Content Manipulation Features

The social network generated according to the foregoing is in one or more embodiments, configured to incorporate content modification functionality. In one embodiment, the generated social network application incorporates a module that configures one or more processors to enable a video sharing and size reduction (e.g. 3gp conversion) of video prior to posting to the user's profile or transmitting to other users. Additionally, the content manipulation module allows for the selections of multiple photos to send from the client device to other users of social network. In one arrangement, the images or content selected for sharing are transferred directly between client devices. However, in an alternative configuration, the content is first sent to a holding queue at the SNHS 106 prior to being sent to the intend recipient(s).

The content modification module includes submodules that provide sorting techniques that allow for a search of attachments to messages or communications without having to review the content of the messages themselves. For example, if User A sends a photo to User B and User C. A user can find the desired content without sorting the overall instant messages by searching for the content of the pictures rather search friends name. In one arrangement, this search feature is implemented by machine learning algorithms that classify and categorize the content of the images stored in the user's mailbox or message repository.

In a further embodiment, the content modification configures the processor(s) to remove or hide some content based on key words or other criteria. For example, to delete certain references in a communication, the content modification module executes a search for reference. The user is then able to hide or permanently delete all mentions of this reference from the content on the client device or the user's profile space on the SNHS.

5.4.18 Emailing Feature:

The generated network, in one embodiment is modified by modules to support standard IMAP and SMTP protocols. In this arrangement, actual or virtual IMAP and SMTP servers are extended to support authorization via the industry-standard OAuth 2.0 protocol.

5.4.19 Business Pages

A further module includes functionality to set up a call center or customer service application that allows for users of the social network to access a business line and route multiple calls to pre-arranged call center numbers or routing systems.

5.4.20 Food, Cab, Movie Ticket, Ordering and Gifting Feature:

An additional module includes functionality to book food, taxies, and/or movie tickets. In one embodiment, the client application working in conjunction with the server application allows for the selection of digital and physical good for gifting to other users. In one example, the client app allows user to book restaurants or food delivery, ride share services, movie tickets and other items and send them to a contact in their contact list.

In one or more additional embodiments, the generated social network includes a geographic location information (such as by accessing data provided in a NOSQL Database system with Metadata accessible by the server application) to provide locations of nearby cinemas, restaurants, and gift shops using the location of a requesting client device. For example, the generated social network updates the display of the client device with selectable elements such as icons, check boxes or text elements that provide a link or other interfaces that correspond to the nearby establishments. Based on the language settings used to generate the client application, the locations are represented either by text, icons, characters or other lexigraphic elements that denote the function or purpose of a given establishment. For example, icons representing nearby restaurants or shops are displayed using culturally or linguistically relevant indications such services.

In a further embodiment, the generated system includes links to a 3$^{rd}$ party payment and ordering systems that allow the client to purchase food, tickets, goods and services from nearby locations and have such items delivered to a user designated location.

5.4.21 Phone Transfer:

An additional module includes the ability to access the local contact and information stored on a telephone and transfer that information to a new mobile or client device. For example, all data from one mobile device (e.g. smartphone) is transferable to another device by using the generated system. In this embodiment, the user data stored in the client is mirrored or synchronized to a user master record stored by the server. Thus, when a new device is used with the client application all of the user data contacts and other data is synchronized to the new device. For instance, in one embodiment the generated client device is based on a HTML5-based user interface system designed to make responsive web sites and apps. The client application is then portable to other hardware platforms suitable for implementing the client device code. In an alternative embodiment, the client application is written in a language that allows low level interface with the hardware of the client device, such as Java to enable a native Android client application.

5.4.22 Free App Market:

Furthermore, an additional feature of the customized social network is the inclusion of an application/video game database with which users can install any other app or games in a user's application (native or browser based). Additionally, the application market supports back-end support for various games and contents that enable score retention and multi-user networking. In one further embodiment, the generated social network is configured to accept file upload (such as an .APK file). Such uploaded files are used to generate applications that are used in conjunction with the generated social media network. For instance, a user developed application is packaged and uploaded to the generated social network. The server is configured to use the uploaded file, and any associated metadata or configuration information also sent by the user to generate an application that is listed and is accessible to other users of the generated social network.

5.4.23 Pay Transfer Facility:

A further module provides functionality to allow a user to store card information in a client device rather than server, and access that data from the mobile device at the time of payment. In one embodiment, the client application allows the user to store bank or credit card account information locally on the client device, as opposed to the server. In a further embodiment, the financial information is stored locally in an encrypted format. According to one configuration of the client application, the user is presented with a transfer icon that indicates that money (in local or designated currency depending on the currency) is available for transfer to a $3^{rd}$ party. A user may then open up a chat dialog or direct transfer application and select the amount of money to transfer to the intended recipient. In one embodiment, the money transferred is in the form of digital currencies or non-standard currencies. For example, the user is able to transfer Bitcoins, Litecoin or other digital currencies from digital wallets stored and/or synchronized between the server and the client application.

In a further embodiment, the financial transactions are encrypted on the client device using a secure pin number, code, icon, or QR code. By providing secure encryption at the client application level, the risk that a breech of data at the server or database will expose transactional information is reduced. However, in certain embodiments, the server application is used to encrypt financial and personal information. For example, customized hardware and/or software is used to enable multiple layer security for protecting user data on the server.

When users receive money, they input banking data into the client application and authorize the access of that account by the client or server application. In one embodiment, authorization takes place by providing a PIN number or finger print (where the client device is equipped with a fingerprint scanner). In a further embodiment, the user is able to access a one time pad (OTP) to further encrypt account information or other data. Once a transaction is authorized, the money is deposited with the designated financial institution.

5.4.24 Mobile Teaching Facility:

An additional module permits teachers and students to exchange information and to access prepared tests and other evaluations. In one embodiment of the generated social network, the server application provides to the client application one or more activity pages or instructional applications where a teacher registers school information and creates a virtual class room where the teacher provides audio/visual explanations of educational materials, notes, links and feedback to students. Information pertaining to a particular student is synchronized to the client device so that the information is stored these information are stored in our free database which we provide.

While this specification contains many specific embodiment details, these should not be construed as limitations on the scope of any embodiment or of what can be claimed, but rather as descriptions of features that can be specific to particular embodiments of particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain embodiments, multitasking and parallel processing can be advantageous.

Publications and references to known registered marks representing various systems are cited throughout this application, the disclosures of which are incorporated herein by reference. Citation of the above publications or documents is not intended as an admission that any of the foregoing is pertinent prior art, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention.

What is claimed is:

1. A system for generating a computer network for accessing and transmitting data from multiple users, the system comprising:
a computer network generator having at least one processor and configured by code executing therein to generate an updatable core network package and first module array of network feature modules from a module repository wherein each element of the first array is a reference to one or more modules,
receiving an initiating request to generate a social network application sent by a remote user computer device, wherein the request includes initialization data relating to 1) an estimated size of a user base of a social network supported by the social network application, 2) an estimated technical ability of users in the user base and, 3) a preferred language of the users in the user base wherein the social network application is configured reside on a remote hosting computer and to be accessed by a plurality of client devices, including mobile devices, used by users in the user base;
transmitting, in response to the initiating request, at least one visual indication referencing each element in the first array to the remote user computing device;
selecting, using the remote user computing device, at least one of the visual indications corresponding to a unique element in the first array modules;
transmitting to the computer network generator at least a reference to each selected module;
generating the social network application that includes reference to each of the selected modules and a user interface application customized to the preferred language and the estimated technical ability of the users in the user base wherein, based upon the estimated technical ability, features of the user interface generated by the user interface application are initially enabled or disabled and wherein the social network application is configured to review user actions of each user while using the user interface and wherein, based upon the reviewed user actions of each user, subsequently enable features of the user interface provided to each user that where initially disabled;
deploying the generated social network application to the remote hosting computer, separate from the plurality of client devices, using a hosting configuration based upon the estimated size of the user base wherein deploying the generated social network application includes installing the generated social network application and a database with connections to the generated social network application on a remote computing device accessible to the Internet and
providing a link accessible to the user base to access the user interface application.

2. The system of claim 1, further comprising:
generating the client device application configured to communicate with the deployed social network application.

3. The system of claim 2, wherein the client device application includes a user interface having text in the preferred language of the user base.

4. The system of claim 2, wherein the client device application is installed on one or more of the plurality of client devices.

5. The system of claim 2, wherein the client device application is a web interface.

6. The system of claim 1, wherein the technical ability of the user base includes a group literacy rate.

7. The system of claim 6, wherein the customized user interface includes specific contextual identifiers selected from a target language database.

8. The system of claim 1, wherein, based upon the estimated technical ability, conversion protocols are masked or removed from the user interface generated by the user interface application.

9. The system of claim 1, wherein, based upon the estimated technical ability, default settings for the user interface generated by the user interface application are selected.

10. The system of claim 1, wherein, based upon a first estimated technical ability, one or more icons are used in the user interface generated by the user interface application and based upon a second estimated technical ability, the one or more icons are replaced by a text equivalent.

* * * * *